Oct. 29, 1929.  J. R. GAMMETER  1,733,405
METHOD OF MAKING PNEUMATIC TIRE BANDS
Filed Oct. 31, 1925  2 Sheets-Sheet 1
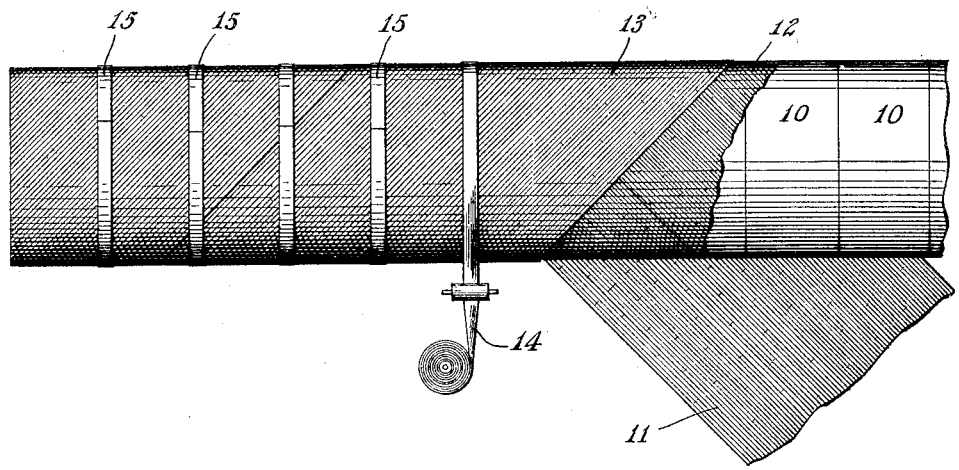
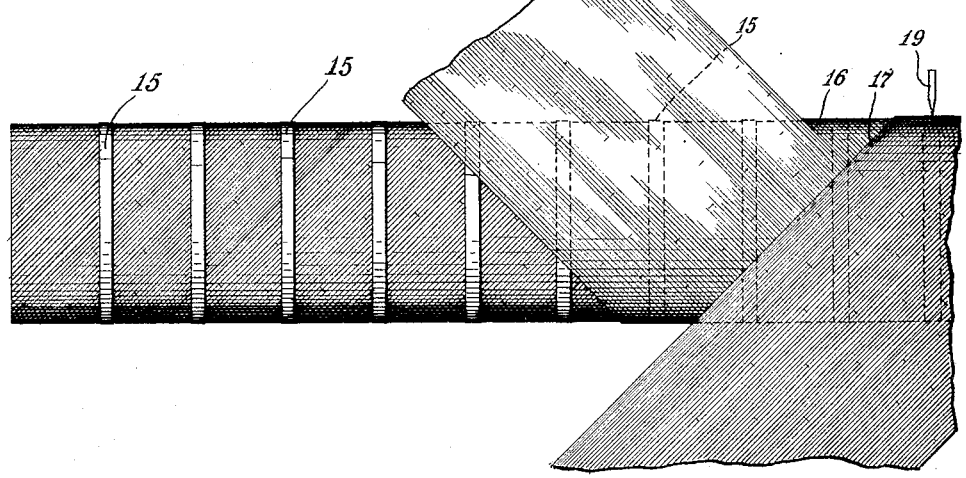
Inventor,
John R. Gammeter
By Pierson, Eakin & Avery
Attys Oct. 29, 1929.   J. R. GAMMETER   1,733,405
METHOD OF MAKING PNEUMATIC TIRE BANDS
Filed Oct. 31, 1925   2 Sheets-Sheet 2
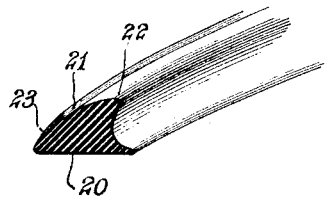
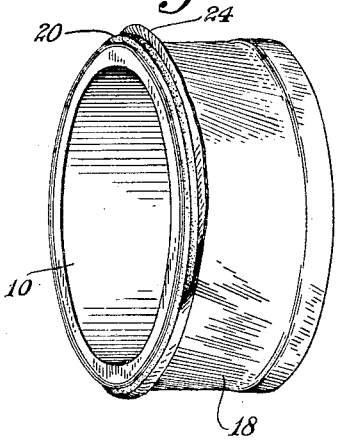
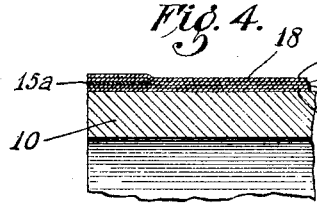
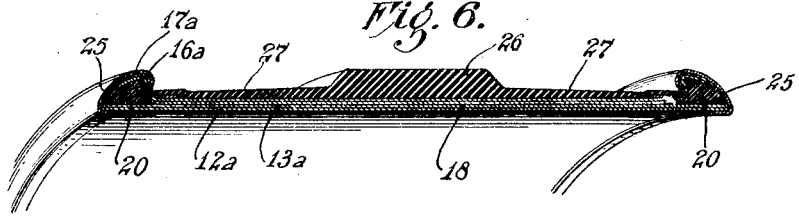
Inventor
John R. Gammeter
By Pierson, Eakin & Avery
Attys.

Patented Oct. 29, 1929

1,733,405

UNITED STATES PATENT OFFICE

JOHN R. GAMMETER, OF AKRON, OHIO, ASSIGNOR TO THE B. F. GOODRICH COMPANY, OF NEW YORK, N. Y., A CORPORATION OF NEW YORK

METHOD OF MAKING PNEUMATIC-TIRE BANDS

Application filed October 31, 1925. Serial No. 66,115.

This invention relates to the art of building pneumatic tires and is especially applicable to the building of tires by the flat band or pulley band method, wherein the tire or the carcass thereof is first built up in the form of a transversely flat, endless band and then forced to tire shape by mechanical or fluid pressure, although it is not wholly limited thereto.

My chief objects are to effect economy of material, to save labor and to provide an accurately constructed tire. A more specific object is to provide a method whereby durable tires may be made from tire bands having under-bead and over-bead plies of the same width, so that both the under-bead plies and the over-bead plies may be incorporated in a continuous, unitary tubular structure adapted to be transversely severed into a plurality of endless tire bands, whereby bands having all plies of the same width are produced.

Of the accompanying drawings:

Fig. 1 is an elevation of an assembly of winding forms or drums, tire-building material in the course of being applied thereto and means for preventing adhesion of under-bead and over-bead plies in certain regions thereof, the same illustrating the preferred procedure in accordance with my invention.

Fig. 2 is an elevation of the same at a later stage of procedure.

Fig. 3 is a perspective view of a part of a bead core of a form preferably employed.

Fig. 4 is a fragmentary sectional view of one of the drums and the work thereon at a later stage of procedure than that shown in Fig. 2.

Fig. 5 is a perspective view of the drum and the work thereon at a later stage.

Fig. 6 is a perspective view of a part of the completed tire band.

Referring to the drawings, a series of winding forms or drums 10, 10, each of a width suitable for that of a tire band, are assembled in axially abutted relation as shown in Fig. 1 and a tubular structure of tire-building material, continuous over a plurality of the drums, is formed upon the assembly. Such structure is preferably formed by winding thereon successive layers of a web of tire-fabric such as the weak-wefted fabric 11, the pitch of the winding preferably being about forty-five degrees and the width of the web preferably being such as to cause successive turns of the winding to contact each other along their margins, so that each winding gives an uninterrupted layer of the fabric. Thus a layer 12 is first applied, which may be followed by a second layer 13 having its warp cords crossing those of the layer 12.

When the desired number of under-bead plies are thus applied, strips of non-adhesive material such as the paper 14 are applied to the assembly to form thereon endless bands 15, 15 positioned over the circumferential lines of junction of the axially abutted drums 10, each band 15 overlapping the abutted margins of the adjacent drums, and the ends of each band 15 being joined, as by pasting, to retain them in place.

Over-bead plies or layers 16, 17 are then wound onto the assembly, over the bands 15, the direction of the winding preferably being reversed as to each succeeding ply, to provide the usual crossing of warp threads.

The laminated, wound structure is then severed as by a knife 19, into individual endless carcass bands such as the band 18, Figs. 4, 5 and 6, by a line of cut coinciding with the circumferential line of junction of the abutted drums, the strips 15 being severed by such cutting and providing a liner strip 15ª, Fig. 4, separating the margins of the under-bead plies 12ª, 13ª and the over-bead piles 16ª, 17ª along each circumferential margin of the carcass-band 18. As the stock upon each of the drums is severed from the stock assembly the drum is preferably removed from the assembly of drums for further operations in the building of the tire, such as the setting of the bead cores and application of the tread and side-wall stock.

The preferred form of bead-core employed in this method is shown at 20, that here shown being of the soft type commonly used in clincher tires, although my invention is not wholly limited thereto. The bead-core 20 differs from the usual type in that it is formed with an offset or shoulder 21 on its outer face of a width equal to the combined thickness of the over-bead plies 16ª, 17ª, the shoulder 21 dividing the outer face of the bead into a longitudinal depressed zone 22 laterally extending to the heel of the bead and adapted to receive the margin of the over-bead plies with their edges abutting the shoulder, as shown clearly in Fig. 6, and a longitudinal zone 23 laterally extending to the toe of the bead. The bead core is thus adapted to be incorporated in the tire-band with the outer surface of the outermost over-bead ply 17$^a$ lying flush with the surface of the zone 23 of the bead-core, as shown in Fig. 6, providing a bead of proper form in section although the over-bead plies do not extend to the toe.

In placing the bead-core the margin 24 of the over-bead plies is lifted or turned back, as shown clearly in Fig. 5, which may readily be done by reason of the over-bead and under-bead plies being separated by the liner strip 15$^a$, which is removed for the reception of the bead core. The bead core is then mounted and pressed in place upon the under-bead plies, the margins of the over-bead plies are stitched into place about the heel of the bead-core, and a finishing strip 25, overlapping the margins of both the under-bead plies and the over-bead plies, is applied.

The tread stock 26 and the side wall stock 27, 27 are then applied and the tire-band is shaped and vulcanized as desired. The mounting of the bead cores and other parts of the tire-band may be performed while the carcass-band remains upon the drum upon which it was originally wound, as shown, but my invention is not limited to this procedure.

Substantial economy of tire fabric is effected by the elimination of trimming waste and an amply strong construction is obtained without over-bead plies of greater width than the under-bead plies. Thus it is made feasible to wind all plies into a continuous tubular structure to be transversely cut into a plurality of complete carcass-bands, whereby economy of labor is obtained.

My invention is susceptible of substantial modification within its scope, and I do not wholly limit my claims to the exact procedure shown and described herein.

I claim:

1. The method of building a tire which comprises forming a tubular structure of tire-building material, applying thereto at spaced intervals circumferential bands of liner material, forming a second tubular structure of tire-building material thereon, over the said bands, to produce a laminated, tubular structure, transversely severing the assembly, through the circumferential bands, into a plurality of endless bands, each having the under-bead and the over-bead plies separated by bands of liner material, and substituting bead cores for the said bands of liner material, the carcass material and the bead core being so interfitted as to have outer faces flush with each other.

2. The method of building tire-bands which comprises forming a tubular structure of tire-building material, applying thereto at spaced intervals circumferential bands of liner material, forming a second tubular structure of tire-building material thereon, over the said bands, to produce a laminated tubular structure, and transversely severing the assembly, through the circumferential bands, into a plurality of endless bands.

3. A method as defined in claim 2 in which the laminated tubular structure is formed by helically winding webs of tire-fabric onto a series of axially abutted drums and in which the circumferential bands are applied and the assembly is severed at the lines of junction of the drums.

4. The method of building a tire which comprises helically winding under-bead tire-building material into a tubular structure, helically winding over-bead tire-building material onto the said tubular structure to form a second tubular structure thereon, severing the resulting structure transversely to remove an endless band therefrom, and forming the band into a tire with bead-cores interposed between the said under-bead material and the said over-bead material.

5. The method of building tire-bands which comprises forming a tubular structure comprising a plurality of plies of tire-building material upon an axially aligned series of drums, severing said structure transversely to provide an endless band upon each drum, and then mounting bead cores between the plies of material on each drum while it remains thereon.

In witness whereof I have hereunto set my hand this 27th day of October, 1925.

JOHN R. GAMMETER.